(12) United States Patent
Nakamura (10) Patent No.: US 8,264,608 B2
(45) Date of Patent: Sep. 11, 2012

(54) TELEVISION-SIGNAL RECEIVER AND RECEIVING METHOD

(75) Inventor: Iwao Nakamura, Saitama (JP)

(73) Assignee: Sony Corporation (JP)

( * ) Notice: Subject to any disclaimer, the term of this patent is extended or adjusted under 35 U.S.C. 154(b) by 1230 days.

(21) Appl. No.: 11/879,932

(22) Filed: Jul. 19, 2007

(65) Prior Publication Data

US 2008/0028429 A1    Jan. 31, 2008

(30) Foreign Application Priority Data

Jul. 25, 2006    (JP) ................................ P2006-202367

(51) Int. Cl.
*H04N 5/46* (2006.01)
(52) U.S. Cl. .......................... 348/555; 348/558; 725/72
(58) Field of Classification Search .......... 348/554–558; 725/72
See application file for complete search history.

(56) References Cited

U.S. PATENT DOCUMENTS

| | | | | |
|---|---|---|---|---|
| 5,570,134 | A * | 10/1996 | Hong | 348/467 |
| 5,929,929 | A * | 7/1999 | Yang | 348/565 |
| 6,670,997 | B1 * | 12/2003 | Nortrup | 348/558 |
| 7,430,017 | B2 * | 9/2008 | Lee | 348/558 |
| 7,505,089 | B2 * | 3/2009 | Borseth | 348/731 |
| 2002/0044221 | A1 * | 4/2002 | Okada | 348/558 |
| 2002/0063798 | A1 * | 5/2002 | Koyama | 348/554 |
| 2006/0109381 | A1 * | 5/2006 | Kim et al. | 348/569 |
| 2006/0170776 | A1 * | 8/2006 | Scott et al. | 348/192 |
| 2006/0213967 | A1 * | 9/2006 | Chuang et al. | 235/375 |
| 2007/0226764 | A1 * | 9/2007 | Melin | 725/62 |

FOREIGN PATENT DOCUMENTS

| | | |
|---|---|---|
| JP | 07212665 A | 8/1995 |
| JP | 08222998 A | 8/1996 |
| JP | 2001028718 A | 1/2001 |
| JP | 2005079861 A | 3/2005 |
| JP | 2006202367 | 8/2006 |

OTHER PUBLICATIONS

Robert Hopkins, "HDTV Seminar" Aug. 16, 2002.*
Office Acion from Japanese Application No. 2006-202367, dated Nov. 8, 2011.

* cited by examiner

*Primary Examiner* — Vivek Srivastava
*Assistant Examiner* — Junior Mendoza
(74) *Attorney, Agent, or Firm* — Lerner, David, Littenberg, Krumholz & Mentlik, LLP (57) ABSTRACT

A television-signal receiver includes: a tuner receiving a television signal; a video demodulation unit for an analog broadcast received by the tuner; an audio demodulation unit for the analog broadcast received by the tuner; a data demodulation unit for a digital broadcast received by the tuner; a channel-selection controller that controls a channel received by the tuner and is capable of presetting the receive channel; and a determination unit that determine a country or region where the tuner receives the broadcasts, based on a receive result by each channel-selection frequency in the tuner, an analysis result of a blanking signal included in a video signal demodulated in the video demodulation unit, an analysis result of data demodulated in the data demodulation unit, and a demodulation result in the audio demodulation unit.

6 Claims, 11 Drawing Sheets

| TUNING FREQUENCY | | 187.25MHz | 483.25MHz | 837.25MHz | 879.25MHz |
|---|---|---|---|---|---|
| | | USA | USA JAPAN | USA | USA |
| AUDIO SYSTEM ANALYSIS | ANALOG AUDIO MODULATION FREQUENCY | 4.5MHz | 4.5MHz | 4.5MHz | 4.5MHz |
| | ANALOG AUDIO MULTIPLEXING SYSTEM | SOUTH KOREAN SYSTEM | SOUTH KOREAN SYSTEM | SOUTH KOREAN SYSTEM | SOUTH KOREAN SYSTEM |
| | DIGITAL AUDIO MODULATION FREQUENCY | N/A | N/A | N/A | N/A |
| | AUDIO MODULATION SYSTEM | M | M | M | M |
| VIDEO SYSTEM ANALYSIS | LUMINANCE SIGNAL FREQUENCY | 60Hz | 60Hz | 60Hz | 60Hz |
| | COLOR SIGNAL FREQUENCY | 3.579545MHz | 3.579545MHz | 3.579545MHz | 3.579545MHz |
| | COLOR SIGNAL SYSTEM | NTSC | NTSC | NTSC | NTSC |
| | LUMINANCE SIGNAL POLARITY | NEGATIVE | NEGATIVE | NEGATIVE | NEGATIVE |
| | BLANKING SIGNAL INFORMATION ANALYSIS RESULT | N/A | N/A | N/A | N/A |
| DIGITAL BROADCAST ANALYSIS | DIGITAL-BROADCAST-SYSTEM DETERMINATION INFORMATION | N/A | N/A | N/A | N/A |
| COUNTRY DETERMINATION RESULT | | SOUTH KOREA | SOUTH KOREA | SOUTH KOREA | SOUTH KOREA |

PRESET

| PROGRAM | 9 | 16 | 75 | 82 |
|---|---|---|---|---|
| TUNING FREQUENCY | 187.25MHz | 483.25MHz | 837.25MHz | 879.25MHz |

FIG. 8

| TUNING FREQUENCY | | USA<br>JAPAN<br>555.25MHz | USA<br>JAPAN<br>729.25MHz | USA<br>879.25MHz |
|---|---|---|---|---|
| AUDIO SYSTEM ANALYSIS | ANALOG AUDIO MODULATION FREQUENCY | 4.5MHz | 4.5MHz | 4.5MHz |
| | ANALOG AUDIO MULTIPLEXING SYSTEM | N/A | N/A | N/A |
| | DIGITAL AUDIO MODULATION FREQUENCY | N/A | N/A | N/A |
| | AUDIO MODULATION SYSTEM | M | M | M |
| VIDEO SYSTEM ANALYSIS | LUMINANCE SIGNAL FREQUENCY | 60Hz | 60Hz | 60Hz |
| | COLOR SIGNAL FREQUENCY | 3.579545MHz | 3.579545MHz | 3.579545MHz |
| | COLOR SIGNAL SYSTEM | NTSC | NTSC | NTSC |
| | LUMINANCE SIGNAL POLARITY | NEGATIVE | NEGATIVE | NEGATIVE |
| | BLANKING SIGNAL INFORMATION ANALYSIS RESULT | USA | USA | USA |
| DIGITAL BROADCAST ANALYSIS | DIGITAL-BROADCAST-SYSTEM DETERMINATION INFORMATION | N/A | N/A | N/A |
| COUNTRY DETERMINATION RESULT | | USA | USA | USA |

PRESET

| PROGRAM | 28 | 57 | 82 |
|---|---|---|---|
| TUNING FREQUENCY | 555.25MHz | 729.25MHz | 879.25MHz |

FIG. 9

| TUNING FREQUENCY | | CCIR<br>335.25MHz | CCIR<br>JAPAN<br>495.25MHz | CCIR<br>623.25MHz | CCIR<br>USA<br>735.25MHz | CCIR<br>USA<br>807.25MHz |
|---|---|---|---|---|---|---|
| AUDIO SYSTEM ANALYSIS | ANALOG AUDIO MODULATION FREQUENCY | 5.5MHz | 5.5MHz | 5.5MHz | 5.5MHz | 5.5MHz |
| | ANALOG AUDIO MULTIPLEXING SYSTEM | N/A | N/A | N/A | N/A | N/A |
| | DIGITAL AUDIO MODULATION FREQUENCY | N/A | N/A | N/A | N/A | N/A |
| | AUDIO MODULATION SYSTEM | B/G | B/G | B/G | B/G | B/G |
| VIDEO SYSTEM ANALYSIS | LUMINANCE SIGNAL FREQUENCY | 50Hz | 50Hz | 50Hz | 50Hz | 50Hz |
| | COLOR SIGNAL FREQUENCY | 4.433619MHz | 4.433619MHz | 4.433619MHz | 4.433619MHz | 4.433619MHz |
| | COLOR SIGNAL SYSTEM | PAL | PAL | PAL | PAL | PAL |
| | LUMINANCE SIGNAL POLARITY | NEGATIVE | NEGATIVE | NEGATIVE | NEGATIVE | NEGATIVE |
| | BLANKING SIGNAL INFORMATION ANALYSIS RESULT | N/A | N/A | N/A | N/A | N/A |
| DIGITAL BROADCAST ANALYSIS | DIGITAL-BROADCAST-SYSTEM DETERMINATION INFORMATION | AUSTRALIAN SYSTEM | AUSTRALIAN SYSTEM | AUSTRALIAN SYSTEM | AUSTRALIAN SYSTEM | AUSTRALIAN SYSTEM |
| | DIGITAL-BROADCAST DATA INFORMATION | AUSTRALIA | AUSTRALIA | AUSTRALIA | AUSTRALIA | AUSTRALIA |
| COUNTRY DETERMINATION RESULT | | AUSTRALIA | AUSTRALIA | AUSTRALIA | AUSTRALIA | AUSTRALIA |

PRESET

| PROGRAM | 1 | 2 | 3 | 4 | 5 |
|---|---|---|---|---|---|
| TUNING FREQUENCY | 335.25MHz | 495.25MHz | 623.25MHz | 735.25MHz | 807.25MHz |

FIG.10

| TUNING FREQUENCY | | CCIR<br>USA<br>JAPAN<br>519.25MHz | CCIR<br>USA<br>JAPAN<br>567.25MHz | CCIR<br><br><br>631.25MHz |
|---|---|---|---|---|
| AUDIO SYSTEM ANALYSIS | ANALOG AUDIO MODULATION FREQUENCY | 6.0MHz | 6.0MHz | 6.0MHz |
| | ANALOG AUDIO MULTIPLEXING SYSTEM | N/A | N/A | N/A |
| | DIGITAL AUDIO MODULATION FREQUENCY | N/A | N/A | N/A |
| | AUDIO MODULATION SYSTEM | I | I | I |
| VIDEO SYSTEM ANALYSIS | LUMINANCE SIGNAL FREQUENCY | 50Hz | 50Hz | 50Hz |
| | COLOR SIGNAL FREQUENCY | 4.433619MHz | 4.433619MHz | 4.433619MHz |
| | COLOR SIGNAL SYSTEM | PAL | PAL | PAL |
| | LUMINANCE SIGNAL POLARITY | NEGATIVE | NEGATIVE | NEGATIVE |
| | BLANKING SIGNAL INFORMATION ANALYSIS RESULT | GREAT BRITAIN BBC2 | GREAT BRITAIN CH5 | GREAT BRITAIN BBC1 |
| DIGITAL BROADCAST ANALYSIS | DIGITAL-BROADCAST-SYSTEM DETERMINATION INFORMATION | N/A | N/A | N/A |
| COUNTRY DETERMINATION RESULT | | GREAT BRITAIN | GREAT BRITAIN | GREAT BRITAIN |

PRESET

| PROGRAM | 1 | 2 | 5 |
|---|---|---|---|
| TUNING FREQUENCY | 631.25MHz | 519.25MHz | 567.25MHz |

FIG. 11

| TUNING FREQUENCY | | CCIR<br>375.25MHz | CCIR<br>USA<br>JAPAN<br>471.25MHz | CCIR<br>USA<br>JAPAN<br>567.25MHz | CCIR<br>791.25MHz | CCIR<br>USA<br>855.25MHz |
|---|---|---|---|---|---|---|
| AUDIO SYSTEM ANALYSIS | ANALOG AUDIO MODULATION FREQUENCY | 5.5MHz | 6.5MHz | 5.5MHz | 5.5MHz | 6.5MHz |
| | ANALOG AUDIO MULTIPLEXING SYSTEM | N/A | N/A | N/A | N/A | N/A |
| | DIGITAL AUDIO MODULATION FREQUENCY | N/A | N/A | N/A | N/A | N/A |
| | AUDIO MODULATION SYSTEM | B/G | L | B/G | B/G | L |
| VIDEO SYSTEM ANALYSIS | LUMINANCE SIGNAL FREQUENCY | 50Hz | 50Hz | 50Hz | 50Hz | 50Hz |
| | COLOR SIGNAL FREQUENCY | 4.433619MHz | 4.433619MHz | 4.433619MHz | 4.433619MHz | 4.433619MHz |
| | COLOR SIGNAL SYSTEM | PAL | SECAM | PAL | PAL | SECAM |
| | LUMINANCE SIGNAL POLARITY | NEGATIVE | POSITIVE | NEGATIVE | NEGATIVE | POSITIVE |
| | BLANKING SIGNAL INFORMATION ANALYSIS RESULT | THE NETHERLANDS<br>RTL4 | N/A<br>TV5 | THE NETHERLANDS<br>NED1 | N/A<br>N/A | N/A<br>TF1 |
| DIGITAL BROADCAST ANALYSIS | DIGITAL-BROADCAST-SYSTEM DETERMINATION INFORMATION | N/A | N/A | N/A | N/A | N/A |
| FIELD INTENSITY | | 65dBμ | 45dBμ | 70dBμ | 40dBμ | 50dBμ |
| COUNTRY DETERMINATION RESULT | | THE NETHERLANDS | FRANCE<br>LUXEMBURG | THE NETHERLANDS | GERMANY<br>SPAIN<br>THE NETHERLANDS<br>ITALIA<br>AUSTRALIA<br>ASIA | FRANCE<br>LUXEMBURG |

WHEN TOP 80% IN TERM OF FIELD INTENSITY OF ALL RECEIVING STATIONS IS CONSIDERED AS VALID, THE COUNTRY IS DETERMINED BY USER OPERATION FROM THE FOLLOWING CANDIDATES: THE NETHERLANDS, FRANCE, LUXEMBURG

| PRESET | PROGRAM | 1 | 2 | 3 | 4 | 5 |
|---|---|---|---|---|---|---|
| WHEN THE NETHERLANDS IS DETERMINED | TUNING FREQUENCY | 567.25MHz | 375.25MHz | 471.25MHz | 855.25MHz | 791.25MHz |
| WHEN FRANCE IS DETERMINED | TUNING FREQUENCY | 855.25MHz | 471.25MHz | 375.25MHz | 567.25MHz | 791.25MHz |
| WHEN LUXEMBURG IS DETERMINED | TUNING FREQUENCY | 855.25MHz | 471.25MHz | 567.25MHz | 375.25MHz | 791.25MHz |

TELEVISION-SIGNAL RECEIVER AND RECEIVING METHOD

CROSS-REFERENCE TO RELATED APPLICATIONS

The present application claims priority from Japanese Patent Application No. JP 2006-202367, filed in the Japanese Patent Office on Jul. 25, 2006, the entire content of which is incorporated herein by reference.

BACKGROUND OF THE INVENTION

1. Field of the Invention

The present invention relates to a television-signal receiver suitable for application in a television apparatus corresponding to a plurality of broadcast systems, and a receiving method therefor.

2. Description of Related Art

When a user purchases and starts to use a television apparatus, there is a need for presetting of receive channels and the like. There are various methods for presetting, depending on actual circumstances of a country or region where the television apparatus is used. The television apparatus is configured to perform different presettings according to the country or the region where the television apparatus is sold. Alternatively, when a user manually performs the presetting, an instruction manual suited to the country or the region where the television apparatus is used is enclosed with the television apparatus, so that the appropriate presetting can be executed.

Japanese Patent Application Publication 2003-158686 discloses an example of a method in which a broadcast channel is automatically preset.

SUMMARY OF THE INVENTION

On the other hands, a television apparatus that corresponds to a plurality of broadcast systems exists and television apparatuses that do not limit their use in any specific country or region are being developed. In such receivers, the television apparatuses may not be used in certain countries or regions if the channel preset of television apparatus is performed by employing only one system in advance. In such a case, a user who has purchased a television apparatus may need to perform manual preset of the television apparatus again. This leads to an issue of an additional manual operation for a user.

In some countries or regions where the television apparatus is used, there is a need for changing a signal processing state in an internal processing unit such as a tuner. For example, there is a need for changing a receive frequency band in the tuner, a display language setting for various guidance displays on a display panel, or the like. In the past, it is difficult to automatically perform the appropriate changes in these settings.

In the explanation made so far, some of issues in the television apparatus are explained. The same issues, however, may be encountered by other devices (television-signal receivers) that receive the television broadcast. For example, the same issues are found in presetting a tuner in a video recording apparatus containing a tuner for receiving a television signal.

Accordingly, it is desirable to perform appropriate setting of an apparatus for receiving a television signal in a country or a region where the apparatus is installed. The present invention has been made in view of these issues.

In an embodiment of the present invention, a television signal receiving apparatus is configured to perform receiving of a television signal, a video demodulation process of an analog broadcast signal of the received television signal, an audio demodulation process of an analog broadcast of the received television signal, a data demodulation process of a digital broadcast of the received television signal, and a determination process of a field intensity of the received television signal. Based on an analysis result of a blanking signal included in a video signal demodulated in the video demodulation process, an analysis result of data demodulated in the data demodulation process, and a demodulation result in the audio demodulation process, a country or region where the apparatus receives a broadcast is determined.

Accordingly, based on the results of the analysis of a state of the received television signal, it becomes possible to determine the country or region where the apparatus receives a broadcast, permitting setting such as a preset and the like in accordance with the determined country or region.

According to the present invention, based on the results of the analysis of a state of the received television signal, it becomes possible to determine the country or region where the apparatus receives a broadcast, permitting setting such as a preset and the like in accordance with the determined country or region. As a result, even if an apparatus operable with a plurality of broadcast systems is used, it becomes possible to make an automatic regional setting in accordance with the country or region where the apparatus is used.

BRIEF DESCRIPTION OF THE DRAWINGS

FIG. 11 is an explanatory diagram showing a preset example (fifth example) according to one embodiment of the present invention.

DETAILED DESCRIPTION OF EMBODIMENTS

Hereinafter, one embodiment of the present invention is described with reference to accompanying drawings.

Figure 1:
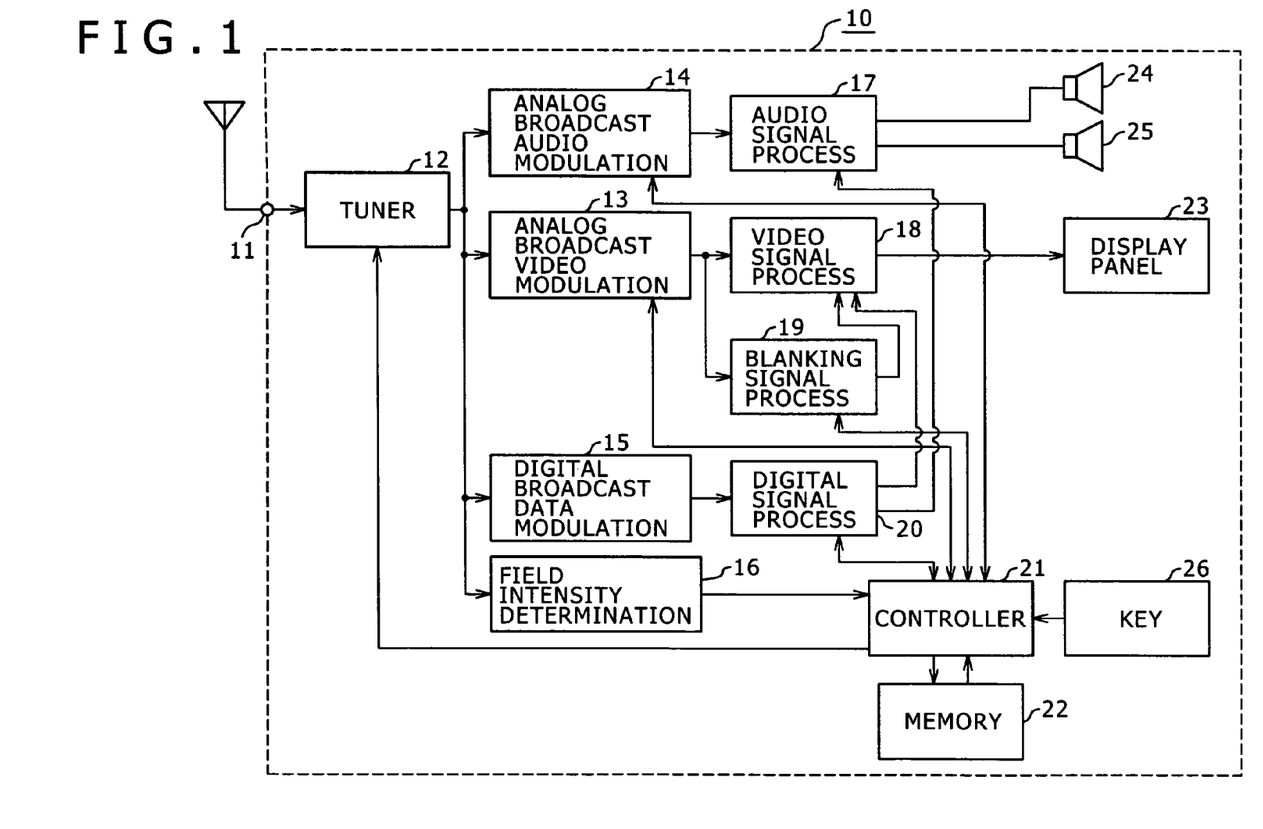
FIG. 1 is a block diagram showing an entire configuration example according to one embodiment of the present invention.

In the embodiment, the present invention is applied to a television apparatus. FIG. 1 shows a diagram showing an example of a configuration of a television apparatus 10 of the embodiment. The television apparatus 10 includes an antenna connecting terminal 11 to which a signal line (antenna line) from an antenna 1 is connected, supplies a tuner 12 with a signal obtained at the antenna connecting terminal 11, and receives a tuning frequency (channel) instructed from a controller 22. In the present specification, "receiving" means a receiving process in which a signal transmitted at the tuning frequency is converted to an intermediate frequency signal or a baseband signal. A television signal obtained by the receiving process is supplied to an analog-broadcast video demodulation unit 13, an analog-broadcast audio demodulation unit 14, a digital-broadcast data demodulation unit 15, and a field-intensity determination unit 16.

In the analog-broadcast video demodulation unit 13, if the television signal received by the tuner 12 is an analog broadcast signal, a video signal of an analog broadcast signal is demodulated. As a result, a demodulated video signal is obtained. The demodulated video signal is supplied to a video-signal processing unit 18 in which a process necessary for displaying the video is performed. The processed video signal is supplied to a display panel 23 so that the video signal is displayed. A blanking signal process necessary for the video display is performed in a blanking-signal processing unit 19. In the blanking-signal processing unit 19, a blanking signal itself and data added in a blanking period are also analyzed.

In the analog-broadcast audio demodulation unit 14, if the television signal received by the tuner 12 is an analog broadcast signal, an audio signal of the analog broadcast signal is demodulated. As a result, a demodulated audio signal is obtained. The demodulated audio signal is supplied to an audio signal processing unit 17 in which performed are a stereo process, a main audio/sub audio switching process, an amplification process, and other processes. The processed audio signal is supplied to speakers 24 and 25, and is outputted therefrom.

If the television signal received by the tuner 12 is a digital broadcast signal, the digital-broadcast data demodulation unit 15 performs a demodulation process of the data for the digital broadcast signal. The data demodulated therein include main data such as video data and audio data, and in addition, various kinds of additional ancillary data. The demodulated video data is supplied to a video-signal processing unit 18 in which a process for displaying the video on the display panel 23 is performed. The demodulated audio data is supplied to the audio signal processing unit 17 in which a process for outputting the audio is performed.

The field-intensity determination unit 16 determines a reception field intensity of the television signal received by the tuner 12. The determination result is supplied to a controller 21. The controller 21 is connected with a memory 22 in which the determination result or the like is stored. The memory 22 stores the determination result and various kinds of information described later. In the memory 22, software for performing a determination based on the stored information is also stored, and further, software for performing a preset such as storing of channels at which stations are selected by the tuner 12. These software programs are executed by the controller 21 such that the relevant processes are performed. The television apparatus 10 includes a key 26 that accepts operations by a user, and is configured such that operation information of the key 26 is supplied to the controller 21 so as to allow performance of various kinds of settings such as a mode setting.

Next, the explanation is given of information other than the reception field intensity supplied to the controller 21. The controller 21 obtains analog audio modulation frequency information demodulated in the analog-broadcast video demodulation unit 13, luminance signal frequency information, color signal frequency information, color signal system information, and luminance signal polarity information. The controller 21 allows the memory 22 to store these pieces of information.

Further, the controller 21 obtains from the analog-broadcast audio demodulation unit 17 analog audio multiplexing system information, digital audio modulation frequency information, and audio modulation system information. The controller 21 allows the memory 22 to store these pieces of information.

Based on a result of analysis, performed by a digital signal processing unit 20, of the data demodulated by the digital-broadcast data demodulation unit 15, the controller 21 obtains digital broadcast system determination information, and allows the memory 22 to store the information.

Further, the controller 21 obtains a result obtained by analyzing the blanking signal information by the blanking signal processing unit 19, and allows the memory 22 to store the information.

Based on these pieces of stored information, and as a result of the controller 21 executing information determination software, which is previously stored in the memory 22, based on each information stored in the memory 22, a country or region where the apparatus receives a broadcast is determined. Based on the determined country or region, a channel preset procedure for the country or region is specified.

On the display panel 23 of the television apparatus 10, various kinds of guidance displays are performed by control of the controller 21. A text language (Japanese, English, and other languages) used at the time of displaying the guidance is to be automatically selected by the controller 21 by using the information of the country or region determined as described above. Information of the specified country or region, the channel preset procedure, and information on the channel preset according to the procedure are also stored in the memory 22. If a plurality of candidate countries or regions (and languages used in the countries or regions) exist, a priority among the candidates is specified, and the user is allowed to select from the candidates by operation of the key 26.

An example of a process for selecting the country or region, which is executed by the control of the controller 21, is described with reference to a flowchart in FIG. 2.

First, the controller 21 sets a tuning frequency to the tuner 12 (step S11). The controller 21 allows the memory 22 to store the tuning frequency (step S19). Further, the controller 21 allows the memory 22 to store the field intensity (step S18). The video signal is analyzed (step S12). The audio signal is analyzed (step S14). The digital broadcast data is analyzed (step S16). Each of the analysis results is stored (steps S13, S15, and S17). A combination of the stored information is determined based on a state of each information (step S20). A selection process for specifying the country or region where the television apparatus 10 is installed is performed (step S21). Based on the country or region specified by the selection process, a channel preset method is selected and determined (step S22). It is noted that at step S21, if a plurality of candidate countries or regions exist, the candidates are displayed on the display panel 23, and the user is allowed to select the candidate by the user operation of the key 26. The setting of the tuning frequency at step S11 is executed for nearly all frequency bands receivable by the tuner 12.

Figure 2:
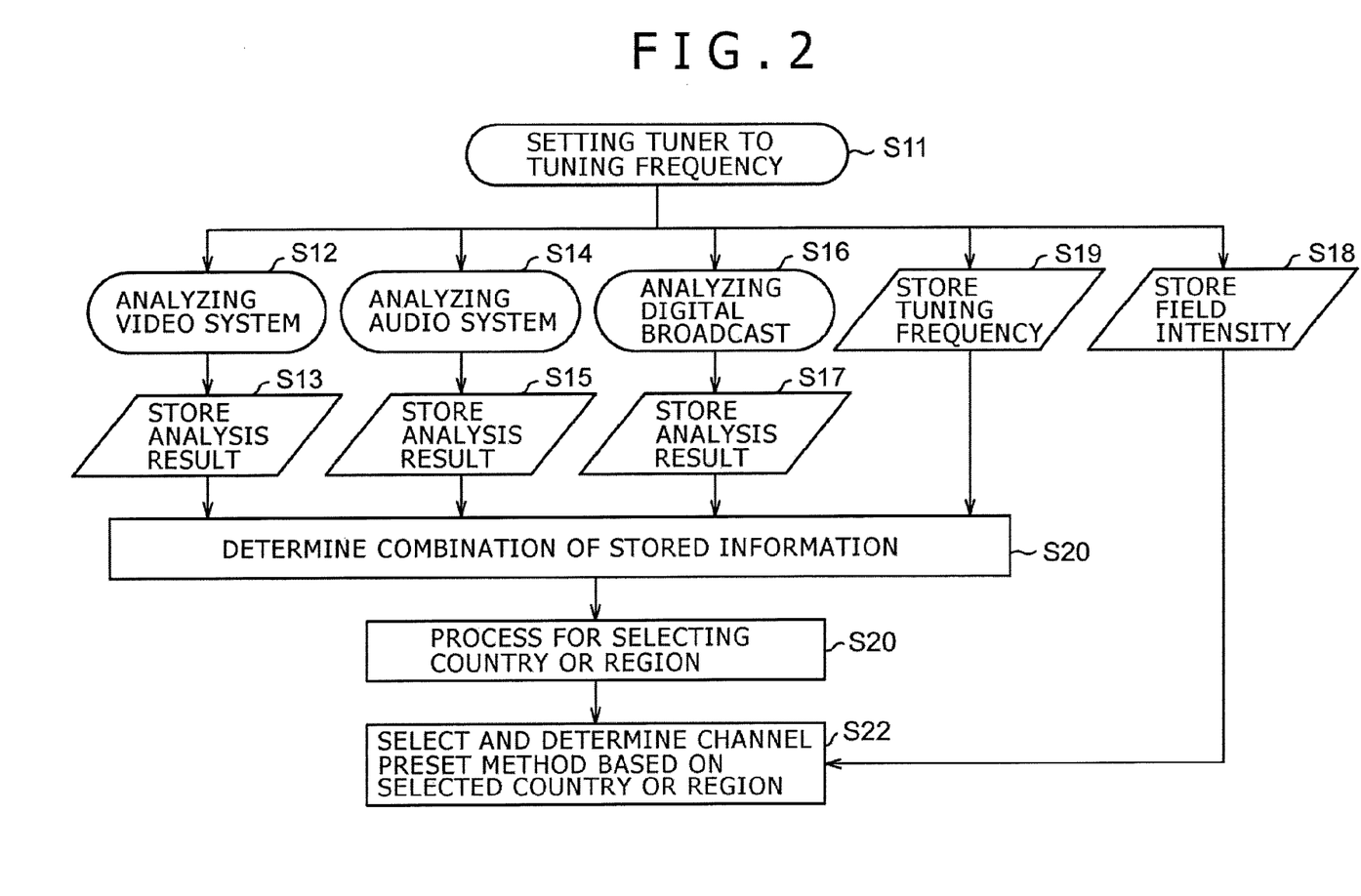
FIG. 2 is a flowchart showing an example of a selection process according to one embodiment of the present invention.
Figure 3:
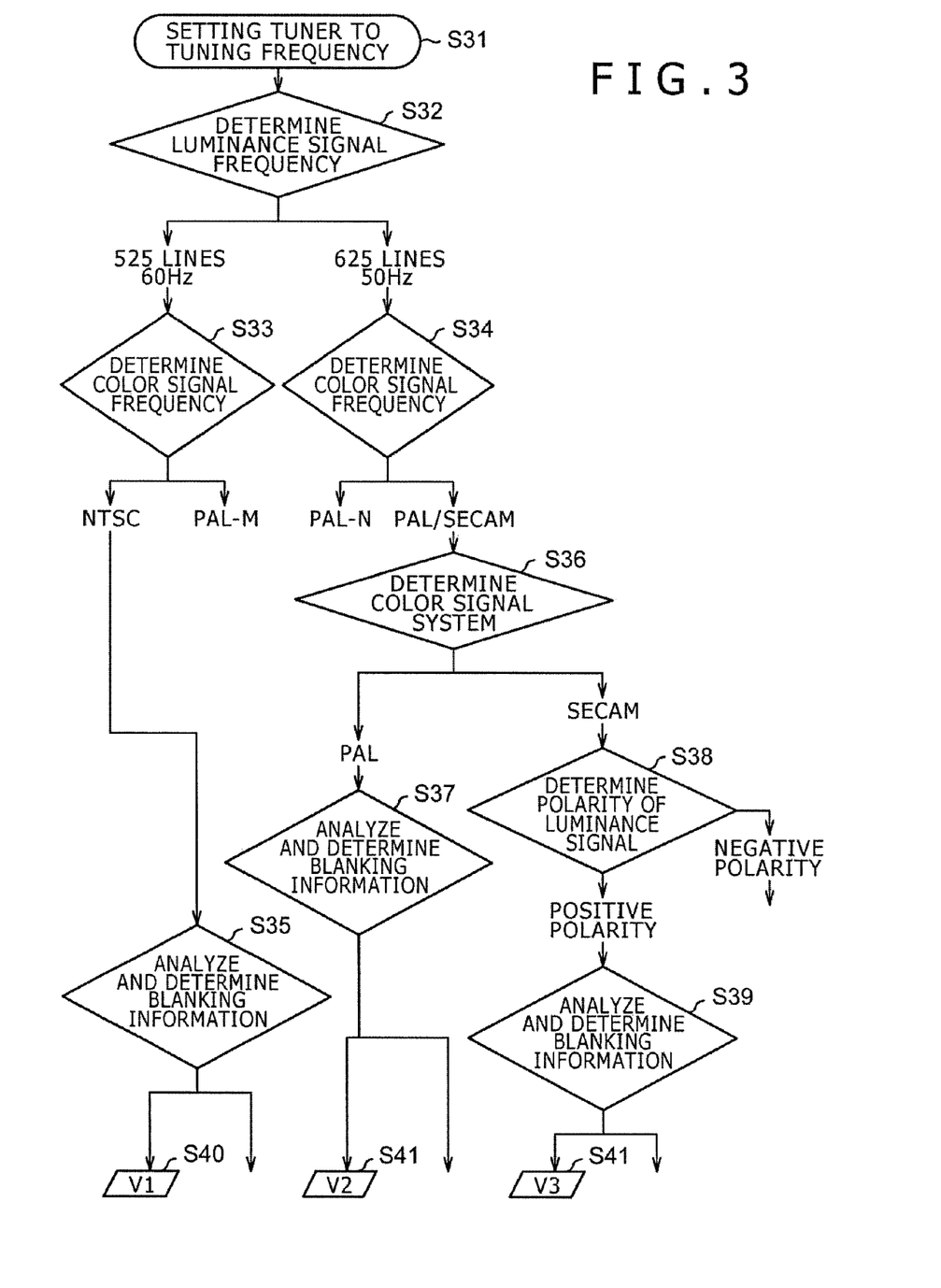
FIG. 3 is a flowchart showing an example of a video analysis process according to one embodiment of the present invention.

FIG. 3 shows one example of the analysis process of the video signal at step S12 in the flowchart in FIG. 2. When the analysis of the video signal is started (step S31), the luminance signal frequency is determined (step S32). From the number of scanning lines and a vertical frequency, the process is branched for a signal of 525 lines/60 Hz and a signal of 625 lines/50 Hz. If it is determined that the signal is 525 lines/60 Hz, the color signal frequency is determined (step S33) to determine whether an NTSC system or a PAL/M system. If it is determined as the NTSC system, the blanking information analysis is then performed (step S35), and a video-system analysis result V1 is obtained depending on a branch condition (step S40).

If it is determined the signal is 625 lines/50 Hz at step S32, the color signal frequency is determined (step S34) to determine whether a PAL-N system or a PAL/SECAM system. If the PAL/SECAM system is determined in the color signal frequency determination, a color signal system is determined (step S36) and the process branches for the PAL system and the SECAM system. In the case of the PAL system, a video-system analysis result V2 is obtained (step S41) from the analysis of the blanking information (step S37). In the case of the SECAM system, a polarity of the luminance signal is determined (step S38). If the polarity is positive, the blanking information analysis is determined (step S39), and a video-system analysis result V3 is obtained depending on a condition (step S42).

Figure 4:
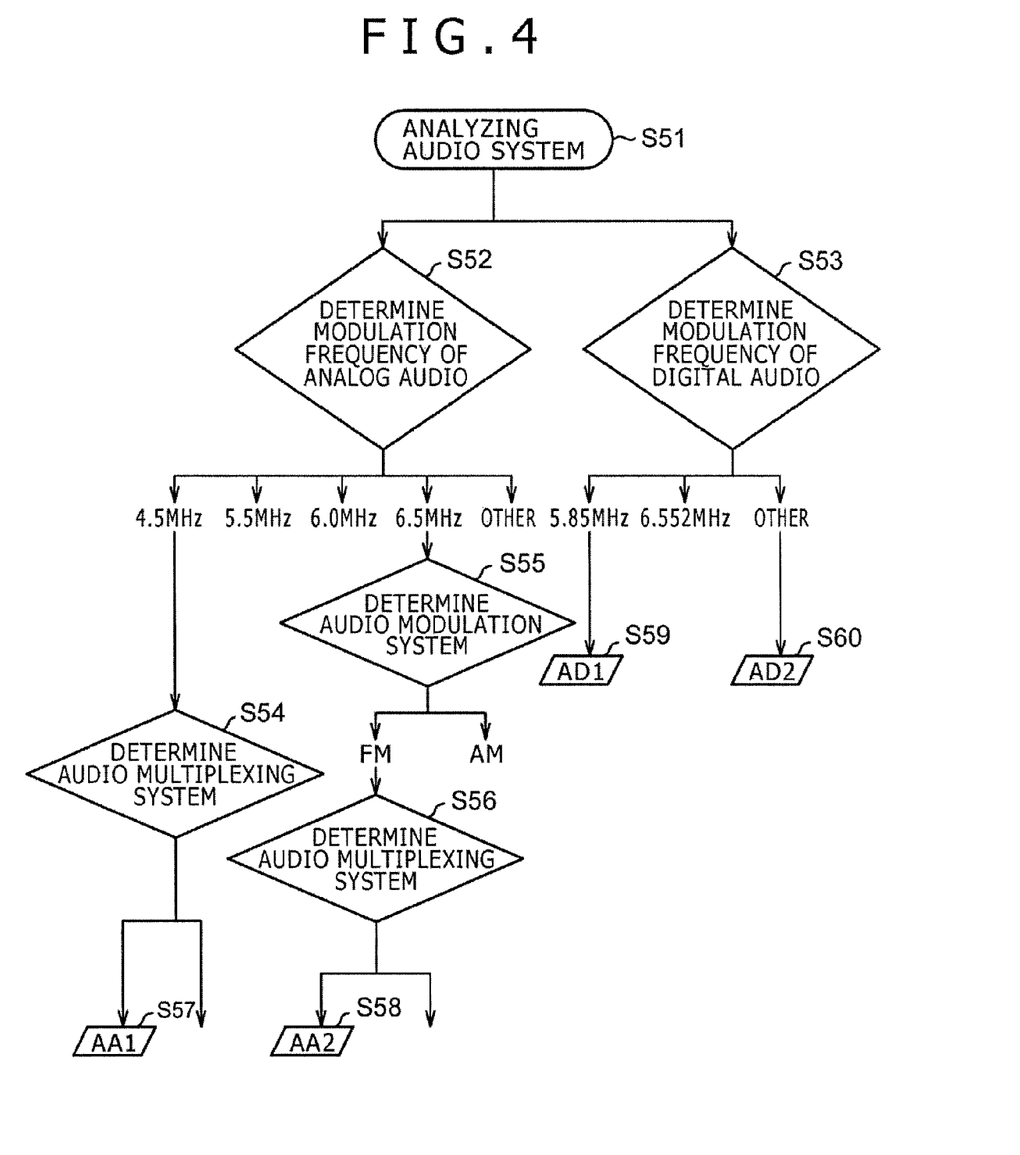
FIG. 4 is a flowchart showing an example of an audio analysis process according to one embodiment of the present invention.

FIG. 4 shows one example of the analysis process of the audio signal at step S14 in the flowchart in FIG. 2. When the analysis of the audio signal is started (step S51), it is possible to obtain both analysis results of an analog audio analysis and a digital audio analysis. The digital audio used herein means a digital audio signal added to the analog broadcast signal.

In the analog audio analysis, a modulation frequency of the analog audio is determined (step S52), and if the modulation frequency is 4.5 MHz, a multiplexing system is determined (step S54). Based on the determination result, an analysis result AA1 of the analog audio of the audio-system analysis result is obtained. In the determination of the modulation frequency at step S52, the audio modulation system is determined (step S55) in the case of a branch of 6.5 MHz. If it is determined as an FM modulation, the multiplexing system is subsequently determined (step S56). Based on the determination result of the multiplexing system at step S56, an analysis result AA2 of the analog audio of the audio-system analysis result is obtained. In Europe and other regions, the digital audio is included in the analog broadcast, and thus, a modulation frequency of the digital audio is determined (step S53). If the modulation frequency is 5.85 MHz, an analysis result AD1 of the digital audio is obtained (step S59). If no digital audio is detected, an analysis result AD2 of an S digital audio is obtained (step S60).

Figure 5:
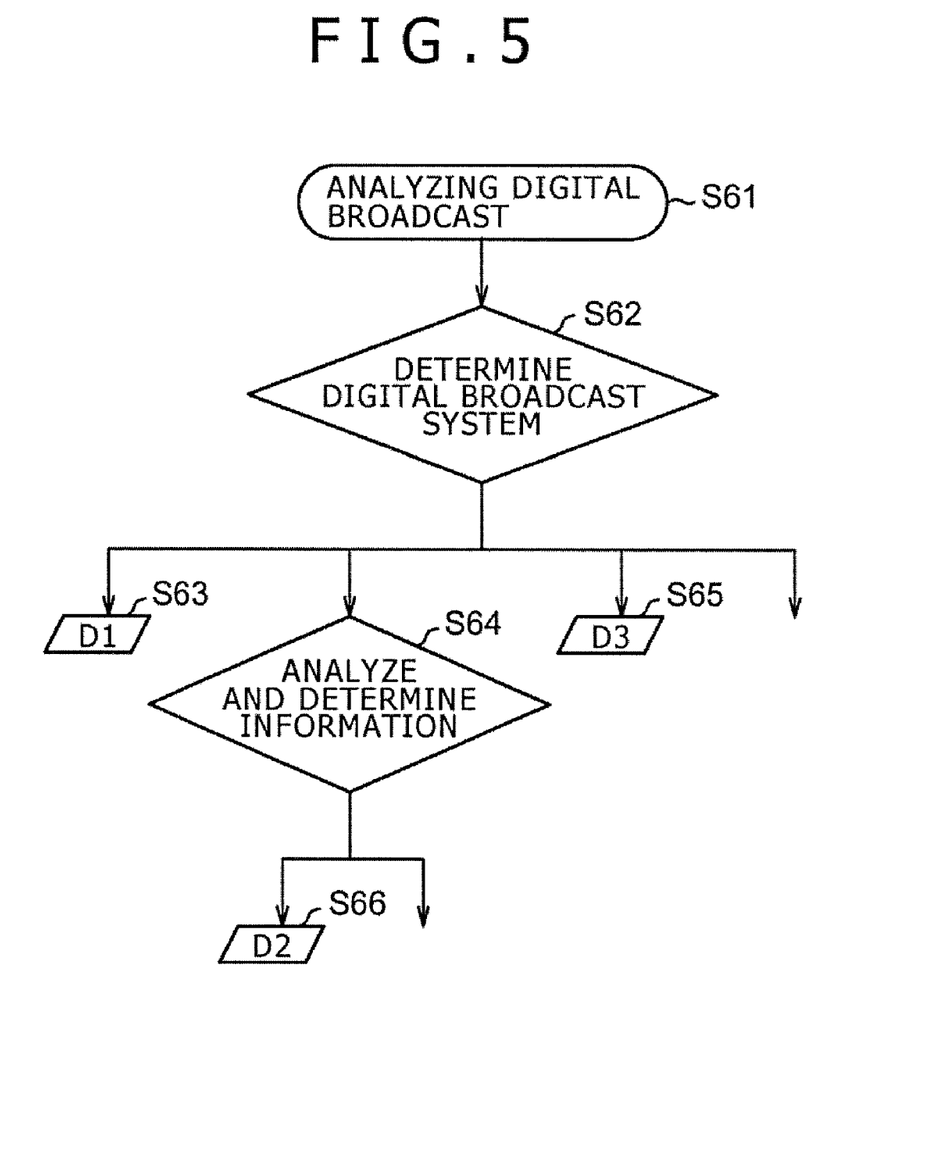
FIG. 5 is a flowchart showing an example of a digital broadcast analysis process according to one embodiment of the present invention.

FIG. 5 shows one example of the analysis process of the digital broadcast at step S16 in the flowchart in FIG. 2. When the analysis of the digital broadcast is started (step S61), a digital broadcast system is determined (step S62). If it is determined as a Japanese digital broadcast system, an analysis result D1 of the digital broadcast is obtained (step S63). If a digital broadcast system used in a plurality of countries is determined, information of the digital broadcast is analyzed and determined (step S64) to obtain an analysis result D2 of the digital broadcast. If the digital broadcast is detected but the system is unknown, an analysis result D3 of the digital broadcast is obtained (step S65).

Figure 6:
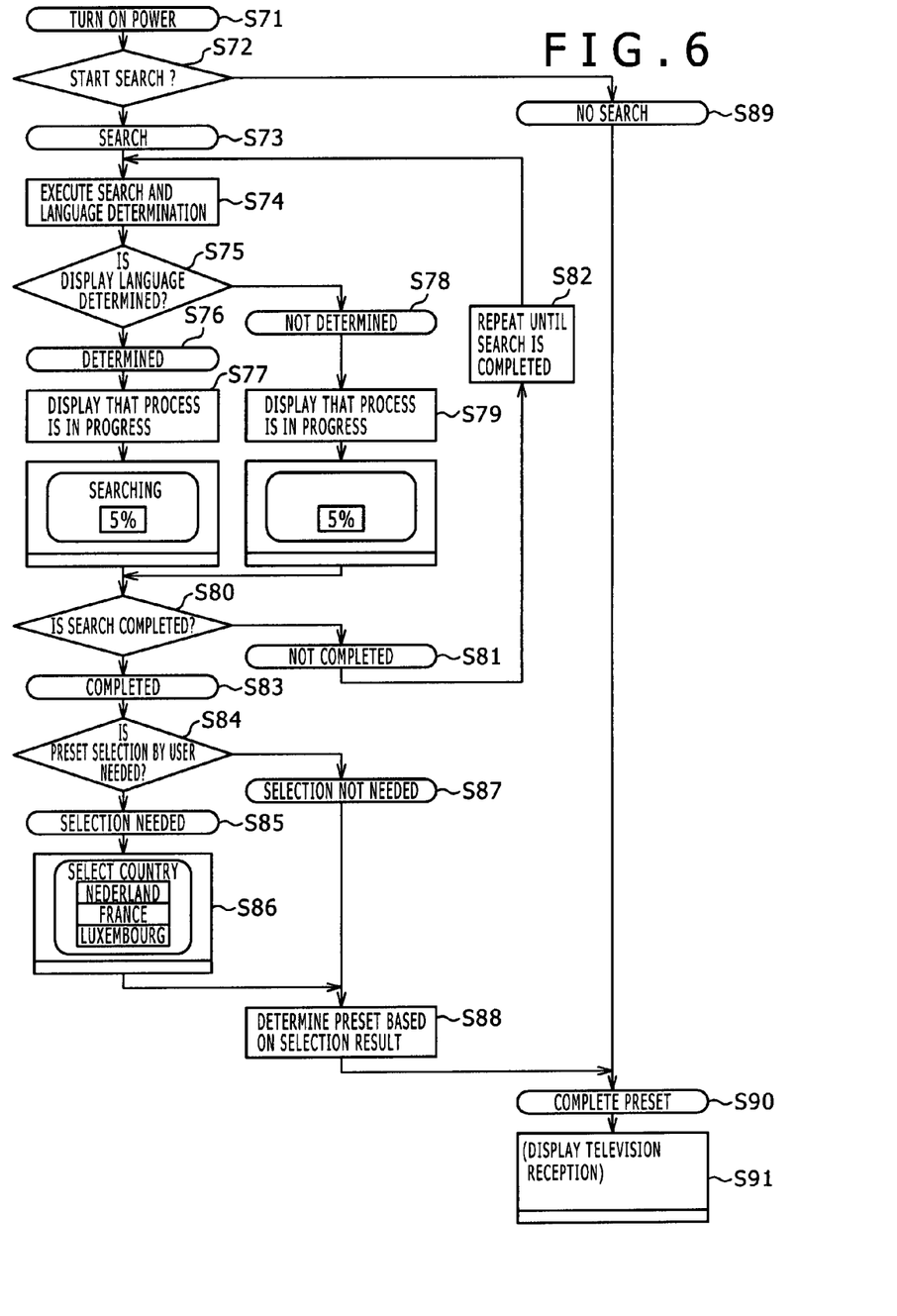
FIG. 6 is a flowchart showing an example of a preset process according to one embodiment of the present invention.

Subsequently, a process example when the channel preset is executed in the television apparatus 10, to which these analysis processes are applied, is described with reference to a flowchart in FIG. 6. First, when a power of the television apparatus 10 is turned on (step S71), the controller 21 determines whether to perform a channel search (step S72). The determination of whether or not to search may be done by determining whether the channels are already preset, for example. If it is determined to execute the search (step S73), the search and a language determination are executed (step S74). Furthermore, it is determined whether the display language is already determined (step S75). If the display language is already determined (step S76), characters of the determined language are used to display that the search is in progress (step S77). In the example in FIG. 6, "Searching" is displayed in English, and shown is a display example in which an execution status of the search process is expressed as percent. If the language is not determined (step S78), the search under progress is displayed without using characters (step S79). In the example in FIG. 6, a display example in which the execution status of the search process is expressed as percent is shown.

Subsequently, it is determined whether the search is completed (step S80). If the search is not completed (step S81), the process is repeated until the search is completed (step S82). The process is repeated from the step S74. If it is determined that the search is completed at step S80 (step S83), it is then determined whether a selection of the preset by the user is needed (step S84). If the selection is needed (step S85), a selection screen display of the country or region (step S86) is performed. Based on the selection result, the data stored as the data of the country or region is used to determine the preset channel (step S88). If the selection is not needed (step S87), the preset channel is directly determined based on the stored data. It is noted that if there is a need for changing the signal process depending on the country or region, such as a receive frequency band of the tuner, a setting for such a change is also performed.

When the preset process is completed (step S90), a received video of the television broadcast of the channel selected from the preset channels is displayed (step S91). Even if the search is not executed at step S72 (step S89), the process again moves to a display of the received video of the television broadcast at step S91.

Subsequently, based on each analysis process, examples of specific combinations in which the country or region is selected are shown in Table 1 to Table 12.

Table 1 shows an example of countries that can be determined from the tuning frequencies in the tuner.

TABLE 1

|  | JAPAN | CCIR | USA |
| --- | --- | --- | --- |
| Tuning frequency | 91.25 MHz | 48.25 MHz | 55.25 MHz |
|  | 97.25 MHz | 55.25 MHz | 61.25 MHz |
|  | 103.25 MHz | 62.25 MHz | 67.25 MHz |
|  | 109.25 MHz | 69.25 MHz | 77.25 MHz |
|  | . | . | . |
|  | . | . | . |
| Country or region to be determined | Japan | Europe Asia Australia | North and Latin America The Philippines South Korea |

Table 2 shows an example of countries that can be determined from the analog audio modulation frequencies.

TABLE 2

| | Analog audio modulation frequency | | | |
|---|---|---|---|---|
| | 4.5 MHz | 5.5 MHz | 6.0 MHz | 6.5 MHz |
| Country or region to be determined | Japan North and Latin America The Philippines South Korea | Germany Spain The Netherlands Italy Australia | Great Britain South Africa | France Russia China |

Table 3 shows an example of countries that can be determined from the analog multiplexing systems.

TABLE 3

| | Analog multiplexing system | | | |
|---|---|---|---|---|
| | Japanese system | South Korean system | US system | German system |
| Country or region to be determined | Japan | South Korea | North and Latin America The Philippines | Germany Spain The Netherlands Italy |

Table 4 shows an example of countries that can be determined from the digital audio modulation systems.

TABLE 4

| | Digital audio modulation frequency | |
|---|---|---|
| | 5.85 MHz | 6.552 MHz |
| Country or region to be determined | Germany Spain The Netherlands Italy France | Great Britain |

Table 5 shows an example of countries that can be determined from the video modulation systems.

TABLE 5

| | Modulation system | | | | | |
|---|---|---|---|---|---|---|
| | B/G | D/K | I | L | M | N |
| Country or region to be determined | Germany Spain The Netherlands Italy Australia | Russia China | Great Britain South Africa | France | Japan North and Latin America The Philippines South Korea Brazil | Argentine |

Table 6 shows an example of countries that can be determined from the luminance signal frequencies.

TABLE 6

| | Luminance signal frequency | |
|---|---|---|
| | 60 Hz | 50 Hz |
| Country or region to be determined | North and Latin America Japan The Philippines South Korea Brazil | Europe Asia (except those listed in the left column) Argentine Australia |

Table 7 shows an example of countries that can be determined from the color signal frequencies.

TABLE 7

| | Color signal frequency | | | |
|---|---|---|---|---|
| | 3.579545 MHz | 3.575 MHz | 3.582 MHz | 4.433619 MHz |
| Country or region to be determined | Japan North and Latin America The Philippines South Korea | Brazil | Argentine | Germany Spain The Netherlands Italy France Great Britain Australia South Africa |

Table 8 shows an example of countries that can be determined from the color signal systems.

TABLE 8

| | Color signal system | | |
|---|---|---|---|
| | PAL | SECAM | NTSC |
| Country or region to be determined | Germany Spain The Netherlands Italy France Great Britain Australia South Africa Argentine Brazil | France Russia | Japan North and Latin America The Philippines South Korea |

Table 9 shows an example of countries that can be determined from the luminance signal polarities.

TABLE 9

| | Luminance signal polarity | |
|---|---|---|
| | Negative | Positive |
| Country or region to be determined | Germany Spain The Netherlands Italy France Great Britain Australia South Africa Argentine Brazil | France Luxemburg |

TABLE 9-continued

|  | Luminance signal polarity |
| --- | --- |
| Negative | Positive |
| Japan North and Latin America The Philippines South Korea Russia | |

Table 10 shows an example of countries that can be determined from the blanking-signal polarity information. This example is to distinguish a system in which the information is added in the blanking period in a Teletext system and a system in which the information is added in the blanking period in a 21H system.

TABLE 10

| Result of blanking signal information analysis | Teletext | | | | 21 H | |
| --- | --- | --- | --- | --- | --- | --- |
| | Germany | Italy | France | Great Britain | USA | Canada |
| Country or region to be determined | Germany | Italy | France | Great Britain | USA | Canada |

Table 11 shows an example of countries that can be determined from the digital broadcast systems.

TABLE 11

| | Digital broadcast system determination information | | | |
| --- | --- | --- | --- | --- |
| | European system | Australian system | US system | Japanese system |
| Country or region to be determined | Europe | Australia | North America South Korea | Japan |

Table 12 shows an example of countries that can be determined from the data added to the digital broadcast.

TABLE 12

| | Digital broadcast data information | | | | | | |
| --- | --- | --- | --- | --- | --- | --- | --- |
| | Great Britain | Germany | United States | Canada | Australia | Japan | South Korea |
| Country or region to be determined | Great Britain | Germany | United States | Canada | Australia | Japan | South Korea |

By using these combinations, it becomes possible to specify the countries or regions.

Subsequently, FIG. 7 to FIG. 11 show an example in which the preset channel is determined from the analysis results.

Figure 7:
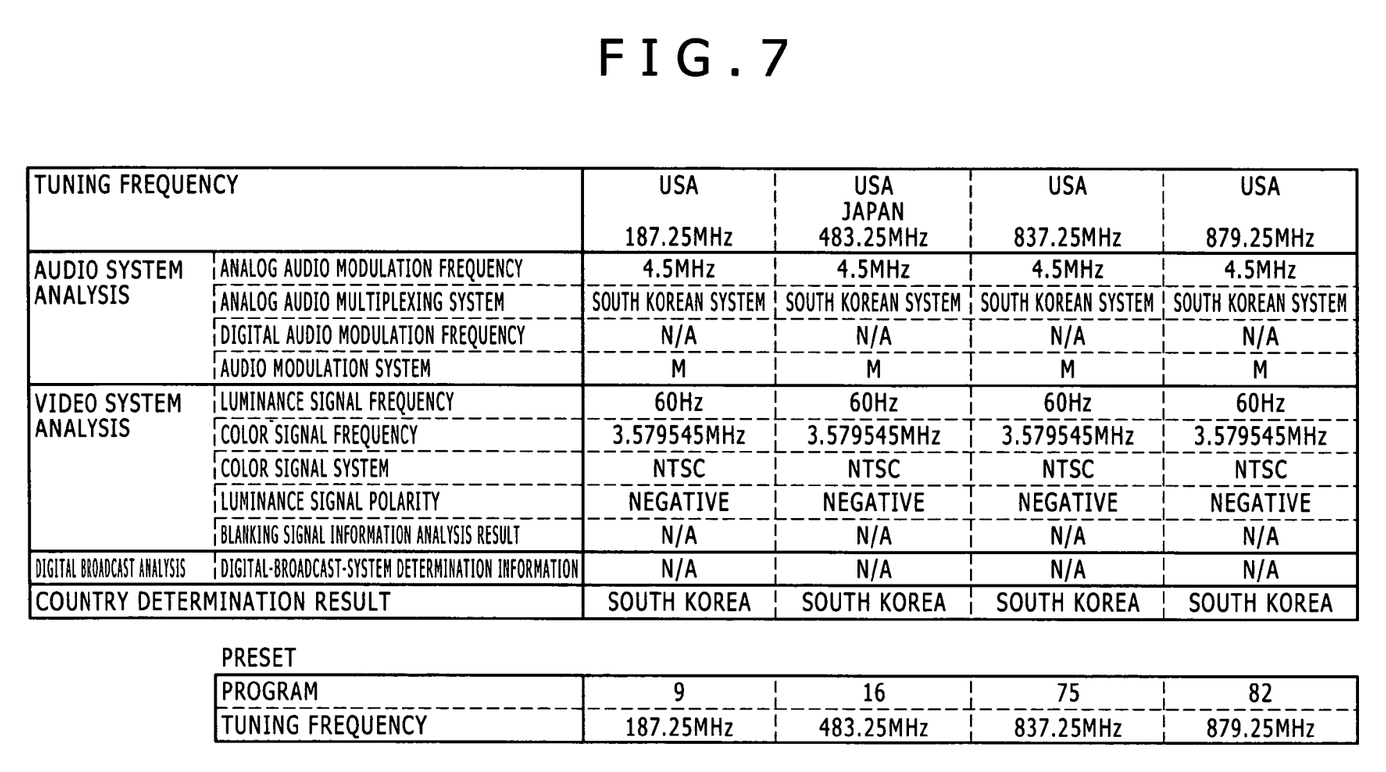
FIG. 7 is an explanatory diagram showing a preset example (first example) according to one embodiment of the present invention.

In Example 1 shown in FIG. 7, a country determination result evaluated from the analysis result of four tuning frequencies indicates South Korea, and thus, the channel preset for South Korea is performed as follows:

| Program 9 | 187.25 MHz |
| --- | --- |
| Program 16 | 483.25 MHz |
| Program 75 | 837.25 MHz |
| Program 82 | 879.25 MHz |

Figure 8:
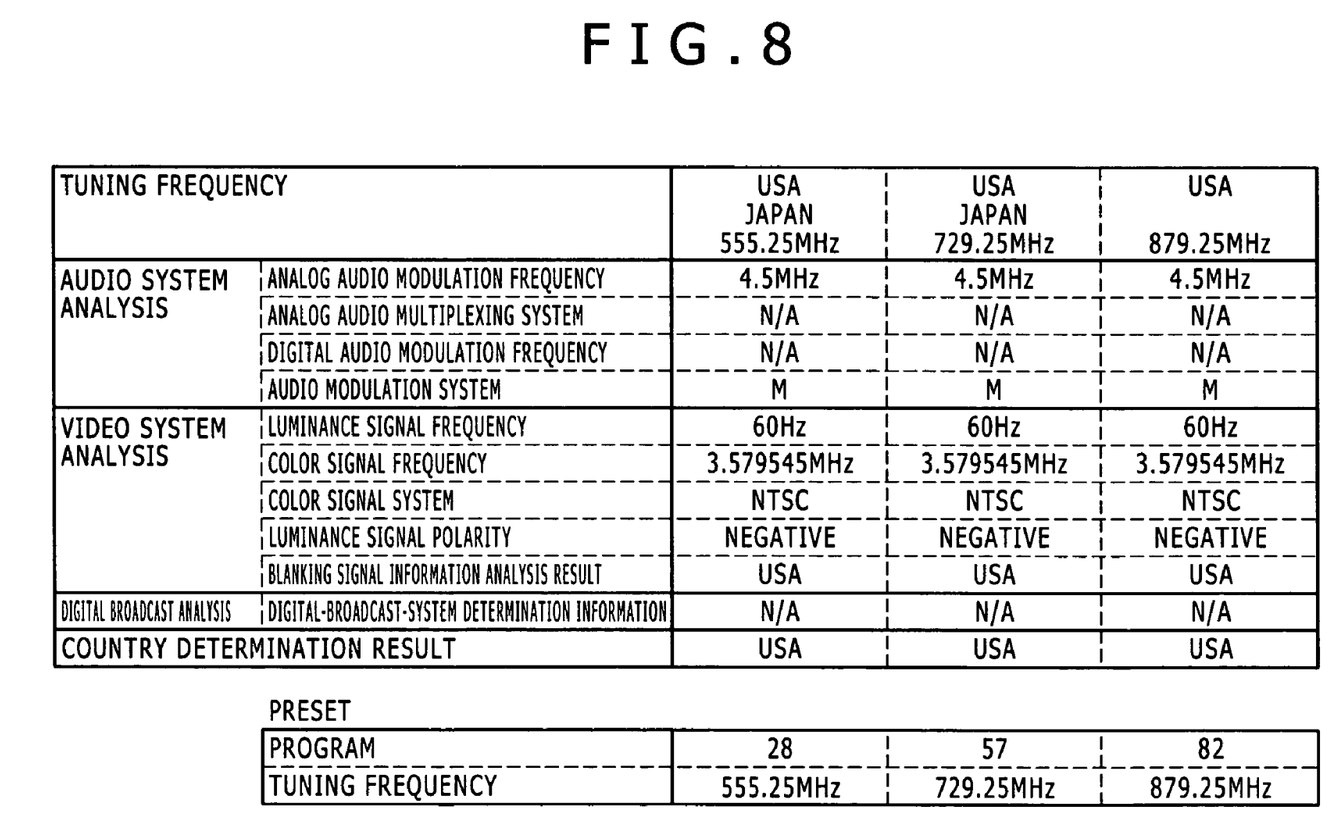
FIG. 8 is an explanatory diagram showing a preset example (second example) according to one embodiment of the present invention.

In Example 2 shown in FIG. 8, the country determination result evaluated from the analysis result of three tuning frequencies indicates United States of America (USA), and thus, the channel preset for the USA is performed as follows:

| Program 28 | 555.25 MHz |
| --- | --- |
| Program 57 | 729.25 MHz |
| Program 82 | 879.25 MHz |

Figure 9:
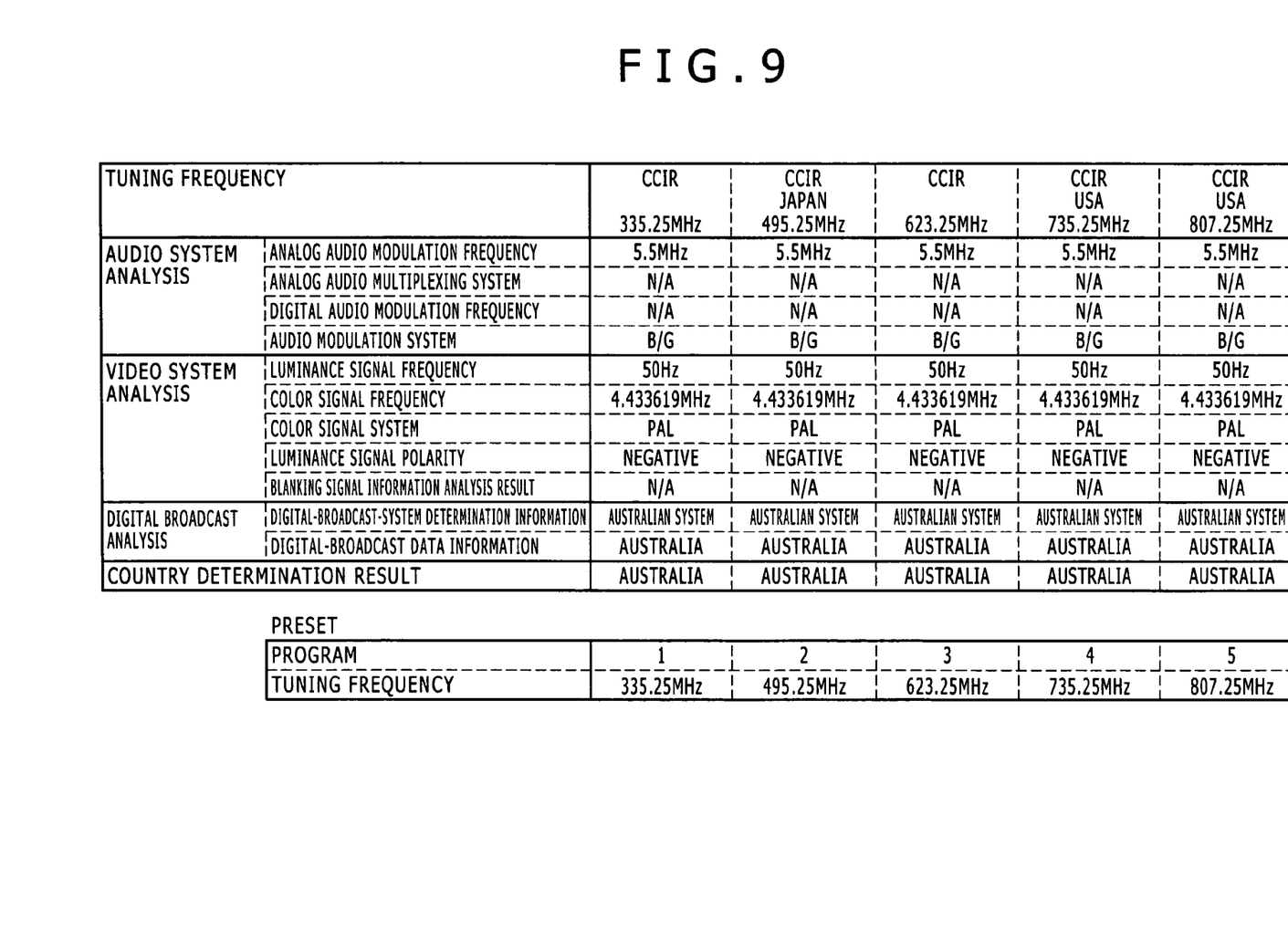
FIG. 9 is an explanatory diagram showing a preset example (third example) according to one embodiment of the present invention.

In Example 3 shown in FIG. 9, the country determination result evaluated from the analysis result of three tuning frequencies indicates United States of America (USA), and thus, the channel preset for the USA is performed as follows:

| Program 1 | 335.25 MHz |
| --- | --- |
| Program 2 | 495.25 MHz |
| Program 3 | 623.25 MHz |
| Program 4 | 735.25 MHz |
| Program 5 | 807.25 MHz |

Figure 10:
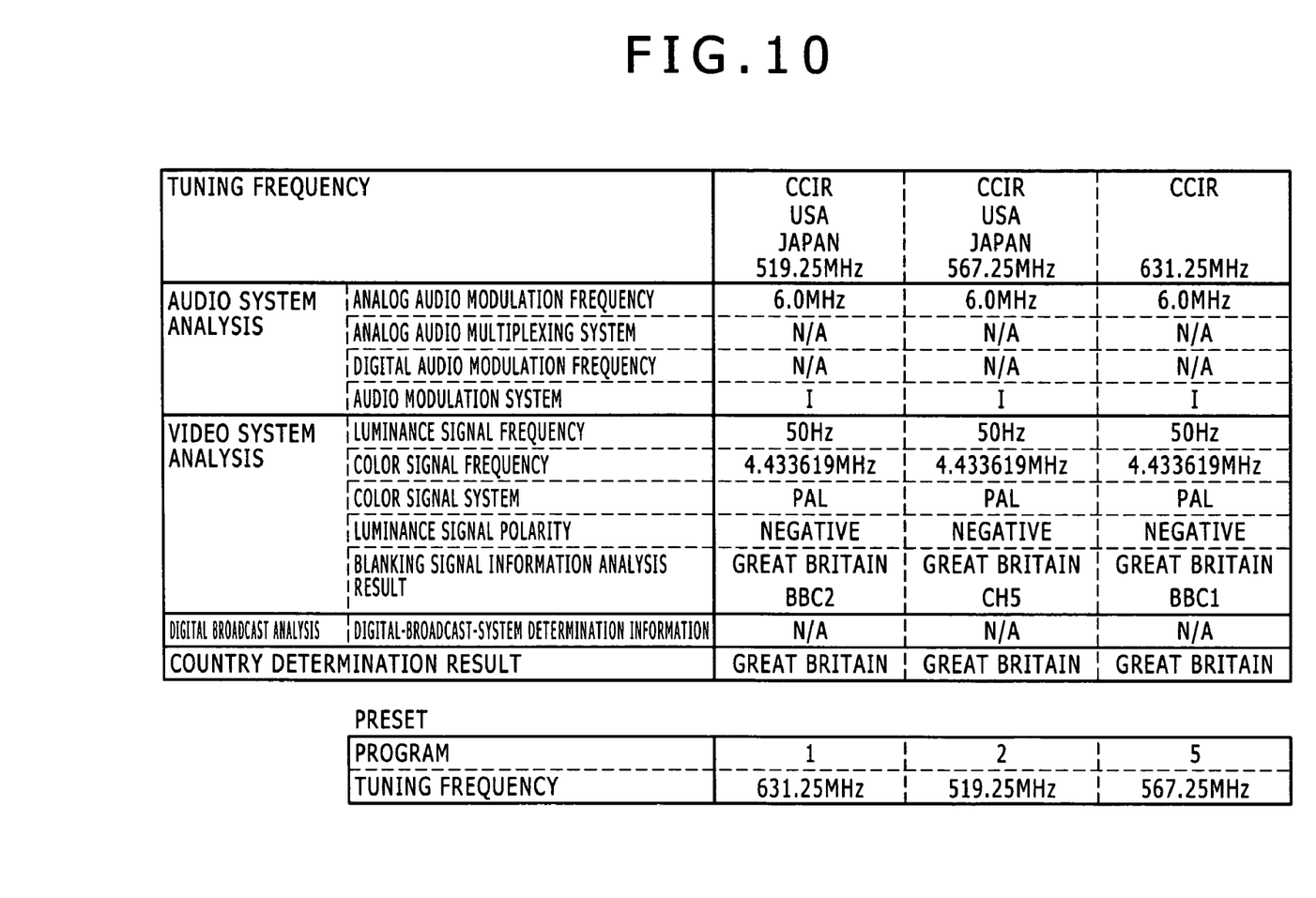
FIG. 10 is an explanatory diagram showing a preset example (fourth example) according to one embodiment of the present invention.

In Example 4 shown in FIG. 10, the country determination result evaluated from the analysis result of three tuning frequencies indicates Great Britain, and thus, the channel preset for Great Britain is performed as follows:

| Program 1 | 631.25 MHz |
| --- | --- |
| Program 2 | 519.25 MHz |
| Program 5 | 567.25 MHz |

Example 5 shown in FIG. 11 is an example in which the top 80% in the order of field intensity of all receiving stations us considered as effective, and as a result, the candidates include the Netherlands, France, and Luxemburg. These candidates are displayed so that the user can select the candidates. FIG. 11 shows an example of the tuning frequencies when each of the candidate countries is selected.

By thus arranging the process configuration according to the embodiment, it becomes possible to correctly preset the receive channels of the television apparatus in an automatic manner irrespective of countries or regions.

It is noted that in the description made thus far, the description is given of a case where the present invention is configured as a television apparatus. However, it may be possible to apply the preset invention to another television-signal receiver provided with a tuner such as a video recording apparatus. Further, it may be possible that the process method described in each flowchart is programmed, and the program is connected to a personal computer apparatus or the like to be mounted as a control program of a tuner for receiving a television broadcast, thereby performing a similar preset or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A television-signal receiver comprising:
a tuner receiving a television signal;
a video demodulation unit for an analog broadcast received by the tuner;
an audio demodulation unit for the analog broadcast received by the tuner;
a data demodulation unit for a digital broadcast received by the tuner;
a channel-selection controller that controls a channel received by the tuner and is capable of presetting the receive channel; and
a determination unit that (i) determines whether a video signal demodulated in the video demodulation unit conforms to an NTSC standard, a PAL standard, or a SECAM standard, and utilizes the determined standard to analyze a blanking signal included in the video signal to obtain a blanking signal analysis result, and (ii) determines a country where the tuner receives the broadcasts based on a receive result by each channel-selection frequency in the tuner, the blanking signal analysis result, an analysis result of data demodulated in the data demodulation unit, and a demodulation result in the audio demodulation unit,
wherein the controller sets a receive channel to be preset based on the result determined in the determination unit, and
if a plurality of countries exist in a result as determined by the determination unit, the receive channel to be preset is selectable from the plurality of countries by an input operation performed by a user.

2. The television-signal receiver according to claim 1, wherein:
an effective frequency band of signal reception of the tuner is set based on the result determined in the determination unit.

3. The television-signal receiver according to claim 1, wherein:
a video signal system to be received or demodulated is determined based on the result determined in the determination unit.

4. The television-signal receiver according to claim 1, wherein:
an audio signal system to be received or demodulated is determined based on the result determined in the determination unit.

5. The television-signal receiver according to claim 1 comprising:
a display unit displaying a video signal demodulated in the video demodulation unit or the data demodulation unit; wherein
a text language displayed on the display unit is determined based on the result determined in the determination unit.

6. A television signal receiving method comprising:
receiving a television signal;
performing a video demodulation process of an analog broadcast signal of a received television signal;
performing an audio demodulation process of an analog broadcast of the received television signal;
performing a data demodulation process of a digital broadcast of the received television signal; and
performing a determination process of a field intensity of the received television signal,
determining whether a demodulated video signal obtained from the analog broadcast signal conforms to an NTSC standard, a PAL standard, or a SECAM standard, and utilizing the determined standard to analyze a blanking signal included in the video signal to obtain a blanking signal analysis result, and
determining a country where a broadcast is received based on the blanking signal analysis result, an analysis result of data demodulated in the data demodulation process, and a demodulation result in the audio demodulation process, and
wherein a receive channel to be preset is set based on a determined result, and
if a plurality of countries exist in the determined result, the receive channel to be preset is selectable from the plurality of countries by an input operation performed by a user.

* * * * *